United States Patent [19]

Manaki

[11] 4,456,100
[45] Jun. 26, 1984

[54] BAND BRAKE MECHANISM FOR AN AUTOMATIC TRANSMISSION OF AN AUTOMOBILE

[75] Inventor: Takayuki Manaki, Suita, Japan

[73] Assignee: Kabushiki Kaisha Daikin Seisakusho, Osaka, Japan

[21] Appl. No.: 289,873

[22] Filed: Aug. 4, 1981

[51] Int. Cl.³ .................... F16D 65/06; F16D 49/06
[52] U.S. Cl. ............................ 188/77 R; 188/249; 188/259; 192/107 T
[58] Field of Search ............... 188/77 R, 77 W, 82.6, 188/250 E, 250 G, 250 B, 257, 259, 264 B, 264 D, 26, 58, 249; 192/107 T

[56] References Cited

U.S. PATENT DOCUMENTS

| 1,324,648 | 12/1919 | Cory | 188/77 R |
|---|---|---|---|
| 1,714,833 | 5/1929 | Wilson | 188/77 R |
| 2,637,420 | 5/1953 | Churchill | 188/77 R |
| 3,353,637 | 11/1967 | Chana | 188/77 R |
| 3,399,749 | 9/1968 | Baule | 188/259 |
| 3,732,954 | 5/1973 | Heid | 188/259 |
| 4,311,221 | 1/1982 | Ratner | 188/259 |

FOREIGN PATENT DOCUMENTS 52-71691  5/1977  Japan .
55-48826 11/1980  Japan .

Primary Examiner—Douglas C. Butler
Assistant Examiner—R. R. Diefendorf
Attorney, Agent, or Firm—Armstrong, Nikaido, Marmelstein & Kubovcik

[57] ABSTRACT

An band brake mechanism for an automatic transmission of an automobile, wherein a size and form of a band hoop is determined so that the band hoop may occupy a position by the elasticity in which any portion of the band hoop is not in contact with a drum when the band hoop is in set position before braking.

Projections formed in one body with a housing are arranged around the band hoop for supporting and locating the band hoop in the set position, so that the full length of the band hoop keeps the constant space to the peripheral surface of the drum.

2 Claims, 6 Drawing Figures

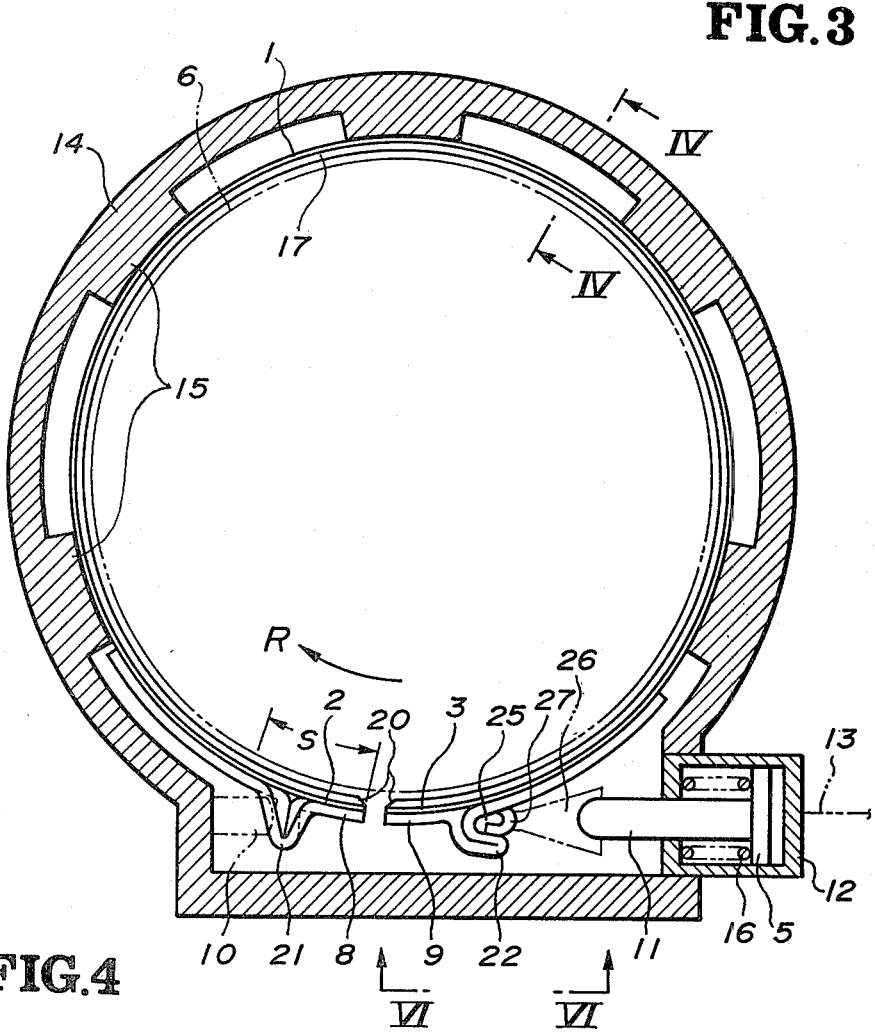
FIG.3
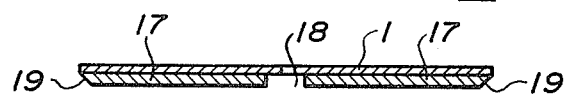
FIG.4
FIG.5
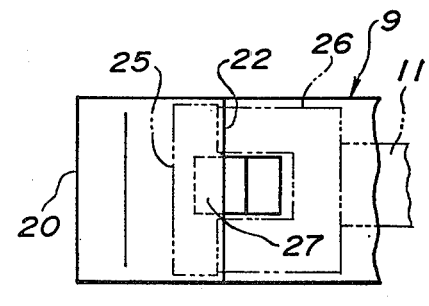
FIG.6

BAND BRAKE MECHANISM FOR AN AUTOMATIC TRANSMISSION OF AN AUTOMOBILE

BACKGROUND AND SUMMARY OF THE PRESENT INVENTION

This invention relates to a band brake mechanism for an automatic transmission of an automobile, wherein brake bands are disposed around a ring gear of a planetary gear mechanism and around an outer housing of a wet multiplate clutch for loading them with braking force.

A band brake mechanism for an automatic transmission should be constructed in a lighter, more compact and more highly efficient structure than those for washing machines and other machines. For a highly efficient structure, a brake band hoop should be constructed so that it can be pressed to a brake drum with a constant pressure along its full length.

However if thin spring steel is used as the band hoop, and a thin friction lining is fixed to a band hoop for a compact, light and highly efficient structure, the following disadvantages may result. Namely, referring to FIG. 1, a band hoop 1' in free condition before setting was formed so that it might keep a constant space away from the full peripheral surface of a drum 6. However when the band hoop 1' is set as shown in FIG. 1, and a distance between both ends 2 and 3 of the hoop 1' is reduced, the band hoop 1' is deformed into an egg-like shape, and curves most sharply at a middle portion 4 which is most distant from the ends 2 and 3. Because of this deformation, when the load by piston 5 on the end 3 is released, points A and A' slightly touch the drum 6 and drag the drum 6. This results in the disadvantages that a friction lining fixed to the band hoop 1' is partially worn, and that fuel consumption per hour increases.

Accordingly, it is an object of the invention to provide an improved band brake mechanism, wherein the band hoop does not touch the brake drum at any point when the band hoop is not intentionally held against the drum.

Other and further objects, features and advantages of the invention will appear more fully from the following description of the preferred embodiment of the invention.

BRIEF DESCRIPTION OF THE DRAWINGS

FIG. 3 is an elevation partly in section of a band brake mechanism of the invention;

FIG. 4 is a sectional view taken along line IV—IV in FIG. 3;

FIG. 5 is a perspective view of a socket for connecting an anchor at one end of a brake band of the present invention; and FIG. 6 is a bottom plane view of a socket for the opposite end of a brake band of the present invention viewed in the direction of arrow VI—VI in FIG. 3.

DETAILED DESCRIPTION OF THE PREFERRED EMBODIMENT

Figure 2:
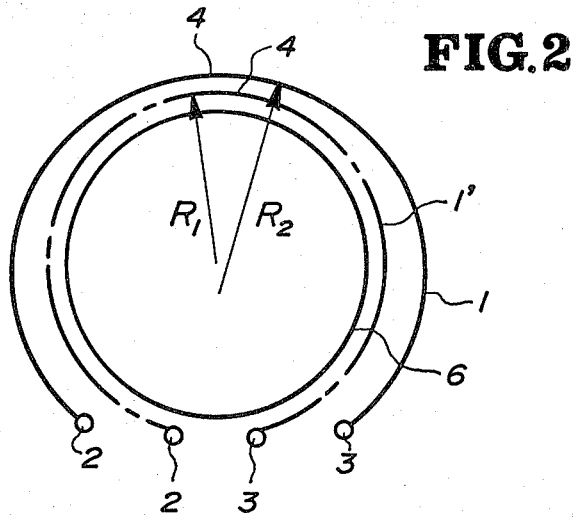
FIG. 2 is a schematic elevation illustrating a known band hoop and a band hoop of the invention in a free condition.

In FIG. 2, a known band hoop 1' in free condition before assembly is illustrated for comparison with a band hoop 1 according to an embodiment of the invention. The band hoop 1 is formed, in consideration of deformation caused by assembly, so that the middle portion 4 most distant from both ends 2 and 3 has a longer curvature radius $R_2$ than the curvature radius $R_1$ of the middle portion 4 of the known band hoop 1'. The radius $R_2$ of the middle portion 4 of the present invention is set to be longer than the curvature radii of the other portions of the band between the portion 4 and the ends 2 and 3. The particular size and form are determined by tests so that the band hoop 1 does not touch the brake drum 6 on any portion before braking operation.

Referring to FIG. 3, the band hoop 1 is illustrated in the set position or the assembled position. When assembled, the band is positioned in an accurate cylindrical shape which is coaxial with the brake drum 6. Sockets 8 and 9 are caulked and riveted to the ends 2 and 3 respectively. An anchor 10 is connected to the socket 8 as detailed hereinafter. The socket 9 is connected through an rod 11 to a piston 5 which is slidably fitted into an servo cylinder 12. The cylinder 12 is fixed to a base member such as the transmission housing 14, and is connected to a hydraulic pump (not shown) through an oil passage 13. The cylindrical housing 14 is provided with projections 15, which are integral with the housing 14 and project inwardly from the housing 14 for supporting and locating the band hoop 1. When the piston 5 does not push the socket 9 as shown in FIG. 3, the band hoop 1 is located by the projections 15 so that the hoop 1 is a constant distance away from the whole peripheral surface of the drum 6.

Referring to FIG. 4, two parallel spaced friction linings 17 and 17 are fixed to the inner surface of the band hoop 1 with a space 18 there-between. An aperture which opens to the space 18 (not shown) for passage of oil is formed at the middle portion 4 (FIG. 2) of the band hoop 1. The edge 19 of each lining 17 opposite to the space 18 is chamfered to forty-five degrees (45°). As shown in FIG. 3 both end edges 20 and 20 of each lining are chamfered at 45°. Each lining 17 is formed by woven asbestos impregnated with resin. It is preferable that double impregnation of resin be applied to portions within an section S near the edge 20.

The Sockets 8 and 9 are formed by belt-like plate members, and are provided near the ends 20 and 20 of the lining with bent portions 21 and 22 projecting radially outwardly with respect to the band hoop 1, respectively. As shown in FIG. 5, the bent portion 21 is divided widthwise into three portions 23, 24 and 23 by two longitudial slits. The middle portion 24 is shifted and hollowed with respect to the side portions 23 and 23. The end of a rod-like anchor 10 is fitted into the hollow between the portions 23 and 23, and is in contact with the portion 24. Referring to FIG. 3, the bent portion 22 of socket 9 is curved so that the top of the curl-like bent portion 22 occupies a position circumferentially further away from the edge 20, and forms a cylindrical channel into which a pin 25 is fitted. As shown in FIG. 6, the pin 25 extends widthwise with respect to the socket 9. Both ends of the pin 25 are engaged by a cut-and-bent portion forming a forked bracket 26 arranged at the forward end of the rod 11. The middle portion of the pin 25 is held by a bent portion 27 of the socket which is cut out partially from the socket 9. The portion 27 is curved and holds the peripheral portion of the pin 25 apart from the edge 20.

In operation, when oil pressure is supplied to the servo-cylinder 12 through the passage 13, the piston 5 moves and projects the rod 11 leftward in FIG. 3. The socket 9 moves forward towards the socket 8. In this manner, the diameter of the band hoop 1 is reduced. The band hoop 1 leaves the projections 15, so that the band hoop 1 is tightly bound around the drum 6 and loads the drum 6 with the braking force. When the supply of oil pressure to the cylinder 12 is stopped, the piston 5 is pushed back by a spring 16 in the cylinder 12 and returns rightward in FIG. 3, so that the band hoop 1, which is thin spring steel, leaves the peripheral surface of the drum 6 by its own elasticity, and returns to the position as set. In this set position, the band hoop 1 contacts the projections 15, and remains accurate coaxially with respect to the drum 6.

According to the invention, as stated hereinbefore because the band hoop 1 is formed of thin spring steel, the band hoop 1 can be curved accurately along the drum 6. Because the form of the band hoop 1 in a free condition is preshaped, the band hoop 1 maintains a constant space away from the drum 6 over the entire length of the band hoop 1 when the band hoop 1 moves away from the drum 6 by its own elasticity after braking. Accordingly such disadvantages as the band hoop 1 dragging the drum 6 when the band hoop 1 is in set position before braking and the friction lining 17 wearing partially can be prevented.

Figure 1:
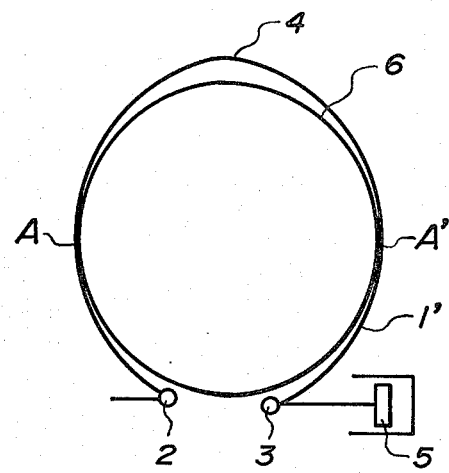
FIG. 1 is a schematic elevation of a known band brake mechanism.

Because the projections 15 are arranged around the band hoop 1 for locating the hoop 1, even a band hoop 1 having a slight error of size and form in free condition can occupy its own desired position by the elasticity by which the band hoop 1 maintains the constant space from the drum 6 without any contact on the drum 6. For comparison, if the projections 15 are utilized with the egg-shaped band hoop 1' in FIG. 1, which is not the invention, only the middle portion 4 in FIG. 1 is strongly and inwardly pressed, and thereby a band hoop 1' may form the wave shape extending on the projections 15. Therefore, the band hoop 1' may touch the drum 6 before braking.

Furthermore, according to the invention, as the projections 15 are integrally formed with the housing 14, the projections 15 can be arranged at accurate positions. Therefore the band hoop 1 can accurately be located at its desired position before braking.

In conclusion, because the projections 15 are utilized with the band hoop 1 formed into an elliptical shape in its free condition, the band hoop 1 is prevented from touching the drum 6 in a set position, which makes it possible to reduce the weight and the size, and to construct a highly efficient band brake mechanism.

Although the invention has been described in its preferred form with a certain degree of particularity, it is understood that the present disclosure of the preferred form can be changed in the details of construction and the combination and arrangement of parts may be resorted to without departing from the spirit and the scope of the invention as hereinafter claimed.

What is claimed:

1. A band brake mechanism for an automatic transmission of an automobile comprising:
    a housing;
    a band hoop in said housing formed by thin spring steel having opposite ends, a middle portion, and a width;
    a first socket and second socket fixed to opposite ends of the band hoop, said first socket being made of a first band-like member having a width equal to said width of said hoop and a bent portion with a middle section, the middle section being partially cut out and hollowed, said second socket being made of a second band like member, having a width equal to said width of said hoop, a curl-like bent portion forming a cylindrical channel, and a cut-and-bent portion facing said curl-like portion with a curvature opposite to said curl-like portion;
    an anchor fitted into said middle section of said first socket;
    a pin fitted into and held in said cylindrical channel by said cut-and-bent portion with the pin contacting said channel across the full width of said second socket;
    a brake drum around which the band hoop is arranged;
    two parallel spaced friction linings circumferentially fixed to the inner surface of the band hoop for pressing the brake drum having a space therebetween;
    an aperture through said hoop into said space;
    the curvature radius of the middle portion of the band hoop in a free condition being longer than that of the portion between the middle portion and each end of the band hoop;
    the size and form of the band hoop being preshaped so that the band hoop occupies a position by its own elasticity in which any portion of the band hoop is not in contact with the drum when the band hoop is in set position before braking;
    projections integrally formed with said housing being arranged around the band hoop for supporting and locating the band hoop in the set position, so that the full length of the band hoop keeps a constant space to the peripheral surface of the drum.

2. The band brake mechanism of claim 1, wherein said friction linings are made of resin-impregnated, woven asbestos, the portions of said linings adjacent said ends of said hoop are chamfered inwardly and are double impregnated with resin.

* * * * *